United States Patent
Wilson et al.

(10) Patent No.: US 9,430,288 B2
(45) Date of Patent: Aug. 30, 2016

(54) JOB SCHEDULING BASED ON HISTORICAL JOB DATA

(71) Applicant: FUJITSU LIMITED, Kawasaki-shi, Kanagawa (JP)

(72) Inventors: Nicholas Wilson, Middlesex (GB); Jim Enright, Slough (GB); Michael Li, Middlesex (GB)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/589,393

(22) Filed: Jan. 5, 2015

(65) Prior Publication Data
US 2015/0199218 A1    Jul. 16, 2015

(30) Foreign Application Priority Data

Jan. 10, 2014    (EP) .................... 14150831

(51) Int. Cl.
  *G06F 9/46*    (2006.01)
  *G06F 9/50*    (2006.01)
  *G06F 9/48*    (2006.01)

(52) U.S. Cl.
  CPC ........... *G06F 9/5011* (2013.01); *G06F 9/4881* (2013.01)

(58) Field of Classification Search
  None
  See application file for complete search history.

(56) References Cited

U.S. PATENT DOCUMENTS

| | | | |
|---|---|---|---|
| 5,442,730 A | 8/1995 | Bigus | |
| 6,889,243 B1 | 5/2005 | Hondou et al. | |
| 2003/0061260 A1* | 3/2003 | Rajkumar | G06F 9/4887 718/104 |
| 2005/0055694 A1* | 3/2005 | Lee | G06F 9/5083 718/100 |
| 2005/0081208 A1* | 4/2005 | Gargya | G06F 9/4881 718/100 |
| 2005/0149940 A1* | 7/2005 | Calinescu | G06F 9/5061 718/104 |
| 2005/0198636 A1* | 9/2005 | Barsness | G06F 9/4881 718/100 |
| 2007/0143765 A1* | 6/2007 | Aridor | G06F 9/5011 718/104 |
| 2008/0155550 A1 | 6/2008 | Tsafrir et al. | |
| 2009/0012930 A1* | 1/2009 | Jackson | G06F 9/505 |
| 2009/0276781 A1* | 11/2009 | Chan | G06F 9/4881 718/103 |
| 2010/0131959 A1* | 5/2010 | Spiers | G06F 9/50 718/105 |
| 2010/0161800 A1* | 6/2010 | Moon | H04L 12/5695 709/226 |

(Continued)

FOREIGN PATENT DOCUMENTS

JP    7-175669    7/1995

OTHER PUBLICATIONS von Achim Streit. "Self-Tuning Job Scheduling Strategies for the Resource Management of HPC Systems and Computational Grids". Oct. 2003.*

(Continued)

*Primary Examiner* — Adam Lee
(74) *Attorney, Agent, or Firm* — Staas & Halsey LLP (57) ABSTRACT

A method of job scheduling in a computing environment, comprising collecting historical job data related to job submissions received from a plurality of users, the historical job data comprising: resource request data indicative of resources requested by the user for executing a job, and resource usage data indicative of actual resources used to execute the job; calculating a believability score for each of the plurality of users based on a comparison between the job resource request data and the resource usage data related to job submissions received from the user, the believability score indicating a degree to which the user overestimates resources required to execute jobs; receiving a new job submission from a user, specifying a new job that is to be executed and resources requested by the user for executing the new job; and scheduling the new job for execution based on the believability score for the user.

11 Claims, 9 Drawing Sheets

(56) References Cited

U.S. PATENT DOCUMENTS

| | | | |
|---|---|---|---|
| 2012/0192188 A1 | 7/2012 | Ferdous et al. | |
| 2013/0138807 A1* | 5/2013 | Perkuhn | H04W 28/26 709/224 |
| 2013/0139169 A1 | 5/2013 | Prabhakar et al. | |
| 2013/0159376 A1* | 6/2013 | Moore | H04L 67/10 709/202 |
| 2013/0346568 A1* | 12/2013 | Forsman | H04L 65/60 709/219 |
| 2014/0068055 A1* | 3/2014 | Iori | G06F 9/5011 709/224 |
| 2014/0137122 A1* | 5/2014 | Egolf | G06F 9/4893 718/102 |
| 2014/0359113 A1* | 12/2014 | Krebs | H04L 41/5009 709/224 |

OTHER PUBLICATIONS

Hovestadt et al. "Scheduling in HPC Resource Management Systems: Queuing vs. Planning". Proc. of the 9th Workshop on Job Scheduling Strategies for Parallel Processing. 2003.*

Sodan et al. "LOMARC—Lookahead Matchmaking for Multi-Resource Coscheduling". Conference: Job Scheduling Strategies for Parallel Processing, 10th International Workshop, JSSPP 2004, New York, NY, USA, Jun. 13, 2004.*

Barsanti et al. "Adaptive Job Scheduling via Predictive Job Resource Allocation". Proceeding JSSPP'06 Proceedings of the 12th international conference on Job scheduling strategies for parallel processing. 2006.*

Tsafrir et al., "Backfilling Using System-Generated Predictions Rather than User Runtime Estimates", *IEEE Transactions on Parallel and Distributed Systems*, Jun. 2007, pp. 789-803, vol. 18, No. 6.

Dimitriadou et al., "Job Scheduling in a Distributed System Using Backfilling with Inaccurate Runtime Computations", *2010 International Conference on Complex, Intelligent and Software Intensive Systems*, 2010, pp. 329-336.

Minh et al., "Using Historical Data to Predict Application Runtimes on Backfilling Parallel Systems", *2010 18th Euromicro Conference on Parallel, Distributed and Network-based Processing*, 2010, pp. 246-252.

Extended European Search Report mailed Jul. 7, 2014, in corresponding European Patent Application No. 14150831.7.

\* cited by examiner

```
#!/bin/bash
#JOB --name run_app_sim1
#JOB -o output.%(jid)
#JOB -e error.%(jid)
#JOB --resource nodes=4
#JOB --resource cores=64
#JOB --user eve
#JOB --time 02:00:00  #format: hh:mm:ss
#run the application
mpirun –np 64 ./app_sim1
```

FIGURE 3A

```
#!/bin/bash
#JOB --name run_app_sim1
#JOB -o output.%(jid)
#JOB -e error.%(jid)
#JOB --resource nodes=4
#JOB --resource cores=64
#JOB --user eve
#JOB --time 00:30:00  #format: hh:mm:ss
#run the application
mpirun –np 64 ./app_sim1
```

JOB SCHEDULING BASED ON HISTORICAL JOB DATA

CROSS-REFERENCE TO RELATED APPLICATION(S)

This application claims the benefit of European Application No. 14150831.7, filed Jan. 10, 2014, in the European Intellectual Property Office, the disclosure of which is incorporated herein by reference.

BACKGROUND

1. Field

Embodiments disclosed herein generally relate to job scheduling and in particular, but not exclusively, to backfill job scheduling.

2. Background

The process whereby a group of jobs is scheduled for execution in a computing environment according to a scheduling algorithm is generally referred to as batch scheduling. The most basic batch scheduling algorithm is the First-Come-First-Served (FCFS) scheduling algorithm. With this algorithm, jobs are placed in a First In, First Out (FIFO) queue upon arrival. If there are sufficient resources available to run the job at the head of the queue, the resources are allocated and the job is started. If there are insufficient resources, the process waits until sufficient resources become available, for example when a currently running job terminates. However, this approach suffers from inefficient system utilization.

Backfilling is an optimization technique that tries to balance the goals of utilization and maintaining FCFS order. While the job at the head of the queue is waiting, it is possible for other, smaller jobs, to be scheduled, especially if they would not delay the start of the job on the head of the queue. This allows resources, which would otherwise remain unused, to be used. Backfill scheduling generally requires users to specify runtime limits for their jobs in order to enable a scheduler to determine where to place the jobs. However, because jobs that execute beyond their specified runtime are usually terminated by the system, users will often overestimate the runtime of their jobs. This leads to scheduling inefficiencies and wasted resources.

Hence, improved job scheduling techniques would be well received in the computing industry.

SUMMARY

According to one embodiment, there is provided a method of job scheduling in a computing environment, comprising: collecting historical job data related to job submissions received from a plurality of users, the historical job data related to a job submission received from a user comprising: resource request data indicative of resources requested by the user for executing a job, and resource usage data indicative of actual resources used to execute the job; calculating a believability score for each of the plurality of users based on a comparison between the job resource request data and the resource usage data related to one or more job submissions received from the user, the believability score indicating a degree to which the user overestimates resources required to execute jobs; receiving a new job submission from one of the plurality users, the new job submission specifying a new job that is to be executed and resources requested by the user for executing the new job; and scheduling the new job for execution based on the believability score of the user.

The believability score of the user provides a useful estimate of whether the resources requested by that user reflects the resources that will actually be required to execute the job, and is a simple but effective way of improving job scheduling. Furthermore, since the believability score is associated with the user, scheduling improvements can be achieved even when the new job is different from jobs previously executed in the computing environment.

The believability score can be used in conjunction with different scheduling algorithms including, for example, a modified FIFO scheduling algorithm in which jobs can be organized and/or prioritized within a queue (at least to some extent) based on the believability scores of the users submitting the jobs. However, use of the believability score is particularly well-suited to backfill scheduling. In one embodiment, scheduling the new job for execution comprises allocating the new job to a backfill window made up of fewer resources than the resources requested by the user. For example, the new job can be allocated to a backfill window with a shorter run time limit than the run time requested by the user. Backfill scheduling based on the believability score increases the number of jobs that can fit into backfill windows with minimal increased risk that the job cannot be completed before the window expires. One way of allocating the new job to such a backfill window can be to modify the job submission, for example by decreasing the specified runtime limit. The amount of resources allocated to the new job can itself be determined based on the believability score.

In order to make the best use of available resources, the scheduling can additionally be based on a calculated utilisation factor that is a ratio of the resources requested by the user to the resources making up the backfill window. This can find the backfill window which best matches the resource requirements for the new job. Similarly, where the new job submission is one of a plurality of such new job submissions, the utilisation factor can be used to select the job which best fits into a given backfill window.

In one embodiment, the new job corresponds to a previously executed job for which historical data has been collected, the historical job data related to a job submission received from a user further comprises performance data indicative of a performance characteristic associated with executing the job, and scheduling the new job for execution is based on the believability score for the user and the performance data of the previously executed job. The use of performance data helps to provide a more accurate estimate of whether the resources requested by the user for a job reflects the resources that will actually be required to execute that job.

In one embodiment, the jobs comprise one or more applications and the believability score for each of the plurality of users is calculated with respect to each application. This again allows jobs to be better matched to available resources. The believability score on the basis of which scheduling is performed can be one of the believability scores or a combination of believability scores (e.g., an average of the believability scores). The one or more applications can correspond to different phases of a job workflow such as pre-processing, running a simulation, and/or post-processing. Accordingly, the performance data referred to above can be application performance analysis data including, for example, profiling and/or tracing data from the execution of the application. For the different procedures (subroutines and functions) in the application, such application performance analysis data can include the call tree of when and where it was called, the number of times it was called and/or how much time was spent in the procedure and its statements. The application performance analysis data can also include more detailed information on communication calls (e.g., the time spent in various Message Passing Interface (MPI) calls, MPI being a portable efficient, and flexible standard used for writing message-passing parallel programs), memory (e.g., hardware counter information), and I/O calls. Such information allows applications to be characterised in terms of the amount of time spent in computation, communication and I/O for a given input.

In one embodiment, the believability score for each of the plurality of users is calculated based on the percentage of requested resources actually used for previously executed jobs. For example, in the simplest case, there can be a linear relationship between the believability score and the percentage of requested resources actually used for previously executed jobs. Furthermore, a lower threshold can be set below which the believability score does not fall. This can be of use where it is known that jobs are likely to end early.

Where a plurality of new jobs is queued for execution, i.e. waiting to be allocated available resources, the believability score can be used to change the order of the queue. In particular, the scheduling can include prioritizing at least one new job that is lower in the queue but submitted by a user with a higher believability score over at least one new job that is higher in the queue but submitted by a user with a lower believability score. Generally speaking, a user with a lower believability score has a greater tendency to overestimate the resources required to execute jobs than a user with a higher believability score. This approach encourages users to provide accurate estimates, as users with a lower believability score are more likely to provide overestimates than users with higher believability score, which in turn improves scheduling efficiency. However, to ensure fairness, the method may restrict how far up the queue a prioritized job can advance.

When a job which has been allocated fewer resources than required, a number of different approaches can be adopted. For example, if during execution of the new job it is determined that the allocated resources are insufficient to complete the job, the new job can be terminated or suspended. However, if the job has almost been completed, the job may be allowed to finish.

In one embodiment, the method further comprises determining, after execution of the new job, an accuracy of the scheduling based on a comparison between the allocated resources and the actual resources used to execute the new job. This allows the integrity of the scheduling to be validated.

According to one embodiment, there is provided a data analyzer, comprising: a data analysis module configured to access a database storing historical job data related to job submissions received from a plurality of users, the historical job data related to a job submission received from a user comprising: resource request data indicative of resources requested by the user for executing a job, and resource usage data indicative of actual resources used to execute the job, and calculate a believability score for each of the plurality of users based on a comparison between the job resource request data and the resource usage data related to one or more job submissions received from the user, the believability score indicating a degree to which the user overestimates resources required to execute jobs.

In one embodiment, the data analysis module further comprises a job submission modification module configured to modify new job submissions received from users based on the believability score.

The data analyzer can be a pluggable module. This provides flexibility in terms of system configurations.

According to one embodiment, there is provided a data analysis apparatus, comprising: the aforementioned data analyser; and a database configured to store historical job data related to job submissions received from a plurality of users, the historical job data related to a job submission received from a user comprising resource request data indicative of resources requested by the user for executing a job, and resource usage data indicative of actual resources used to execute the job.

According to one embodiment, there is provided a computer system, comprising: a scheduler configured to schedule jobs; the aforementioned data analysis apparatus; and computing resources configured to execute scheduled jobs. The computing resources can be High-Performance Computing (HPC) resources.

According to one embodiment, there is provided a computer readable medium carrying computer-readable code which, when executed by a computer, causes the computer to perform the aforementioned method.

Embodiments may be implemented in hardware, firmware, software, or any combination thereof. Embodiments may also be implemented as instructions stored on one or more non-transitory, computer-readable media, which may be read and executed by one or more processors and/or controllers. A non-transitory, computer-readable medium may include any tangible mechanism for storing or transmitting information in a form readable by a computer (e.g., a computing device). For example, non-transitory, computer-readable media may include read only memory (ROM), random access memory (RAM), magnetic disk storage media, optical storage media, flash memory devices, and others. Alternatively, the computer-readable medium could be in the form of a signal such as a downloadable data signal provided from an Internet website.

Further embodiments, features, and advantages of the invention, as well as the structure and operation of the various embodiments of the invention are described in detail below with reference to accompanying drawings.

BRIEF DESCRIPTION OF THE DRAWINGS

Specific embodiments are described below with reference to the accompanying drawings, which are provided by way of example only and in which.

DETAILED DESCRIPTION

Figure 1:
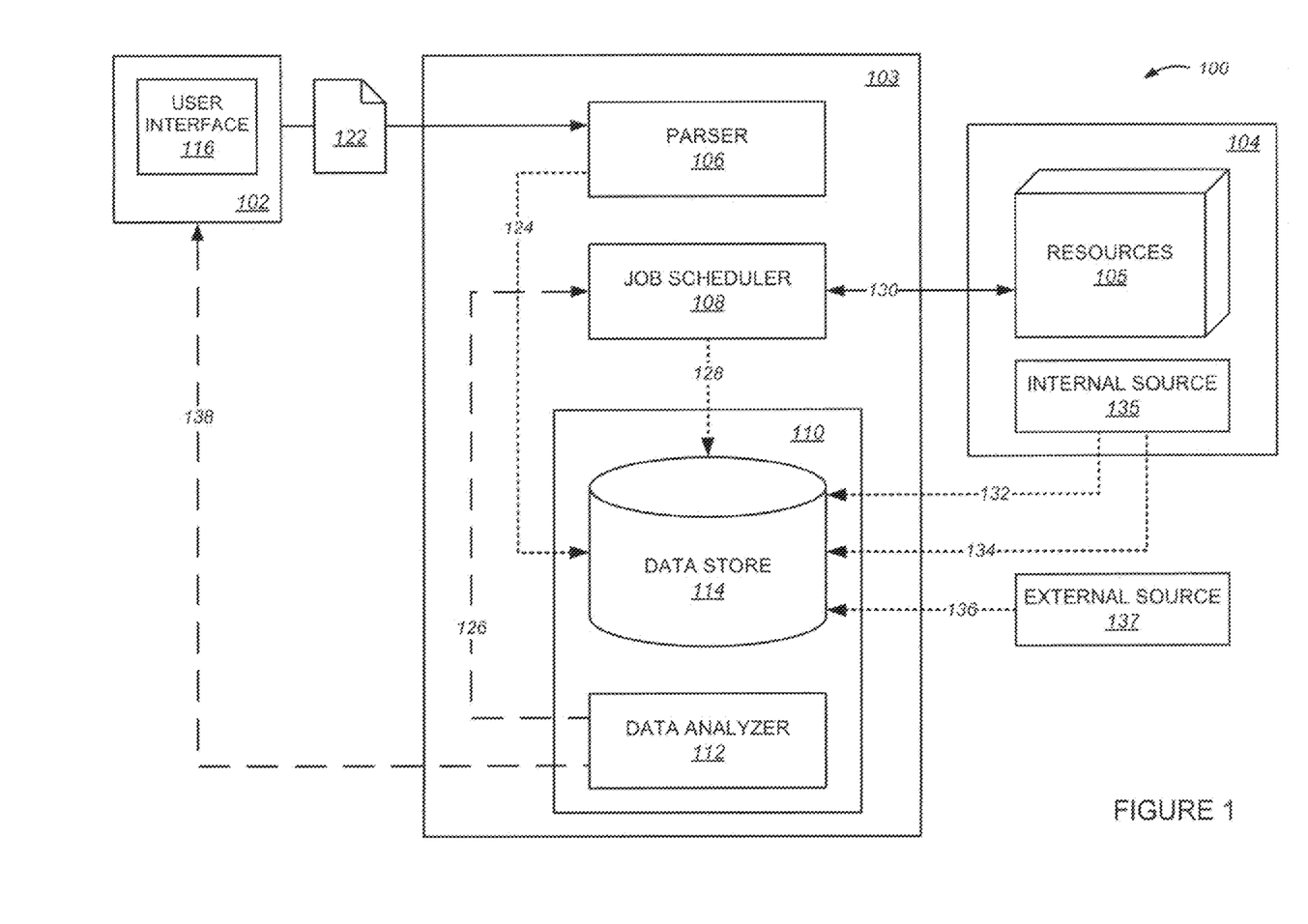
FIG. 1 schematically illustrates a computing environment in which job scheduling is performed, according to an embodiment.

FIG. 1 schematically illustrates a computing environment 100 in which job scheduling is performed, according to an embodiment. Here, the computing environment 100 is a High Performance Computing (HPC) environment including a source computing unit 102, a master computing unit 103 and a destination computing unit 104. A computing unit (102, 103 and/or 104) comprises one or more nodes capable of processing jobs or applications. In a computing unit having a plurality of computing nodes (e.g., a cluster of HPC nodes), the nodes can be coupled to one another via, for instance, a Local Area Network or other type of connection.

The master computing unit 103 receives jobs from the source computing unit 102 and schedules the jobs for execution by the destination computing unit 104 (as will be described in more detail later). The master computing unit 103 comprises a parser 106, a job scheduler 108, and a data analysis unit 110. The data analysis unit 110 comprises a data analyzer 112 and a data store 114, both of which will be described in more detail later.

The computing units 102, 103, 104 can be implemented in a variety of different configurations and can be separate computing units (as shown in FIG. 1) or can be combined in various different combinations. For example, the master computing unit 103 and destination computing unit 104 can be combined into one computing unit. Similarly, the elements of the computing units 102, 103, 104 can be implemented in a variety of different configurations. For example, the data analysis unit 110 can be provided in a different computing unit from that of the parser 106 and job scheduler 108. Likewise, the data analyzer 112 and the data store 114 can be provided in different computing units from one another. Separate computing units can be coupled to one another via, for instance, a high-speed link such as GigaBit Ethernet. Other types of links, switches or other connections may also be used and will be familiar to the skilled reader.

FIG. 1 shows some of the inputs to, and outputs from, the master computing unit 103 and its elements. In particular, dotted arrows represent inputs to the data store 114 of the data analysis unit 110, and dashed arrows represent outputs from the data analyzer 112 of the data analysis unit 110. Solid arrows represent some of the inputs to/outputs from other elements of the master computing unit 103. It will be appreciated that various other inputs, outputs and interactions are possible, such as between the data analyzer 112 and the data store 114 and between the parser 106 and the job scheduler 108, but these are not shown in the interests of clarity.

Users create job submissions at the source computing unit 102 by means of a user interface 116, for example a graphical user interface presented on a display. Job submissions typically specify the jobs that are to be executed as well as the requested resources to execute those jobs. In particular, job submissions are created by building a job script, written in a programming language such as Perl, Python or Bash, and contain appropriate commands to launch the program that will perform the job. An exemplary job script will be described in more detail later.

Job submissions 122 are received by the parser 106. For each job submission the parser 106 outputs the job script, application input and data files (collectively denoted by dotted arrow 124) to the data store 114 from where they are analysed by the data analyzer 112 for purposes of scheduling optimization. This will be described in detail later, suffice to say that the optimization is based on an analysis of historical data stored in the data store 114 including, for example, one or more of: job scripts, application input and data files from the previously executed jobs; job scheduler decisions made from these inputs and job scheduler statistics from execution of the job (collectively denoted by reference 128); application performance analysis data such as the balance between computation time, communication time and I/O time; data centre energy usage and efficiency data 132 during application execution obtained from an internal source 135; and any other relevant data 136 from external sources 137 including, for example, data from other sites or application performance characteristics from other systems. When the new job submission is executed, the job script, application input and data files 124 become part of the data about previously executed jobs stored in the data store 114.

Optimized job submissions 126 are output by the data analyzer 112 to job scheduler 108, which is responsible for identifying available resources, scheduling jobs and tracking the current status of jobs (collectively denoted by solid arrow 130). The data analyzer 112 also outputs notifications 138 to the source computing unit 102, for example notifications indicative of job script modifications.

Figure 2A:
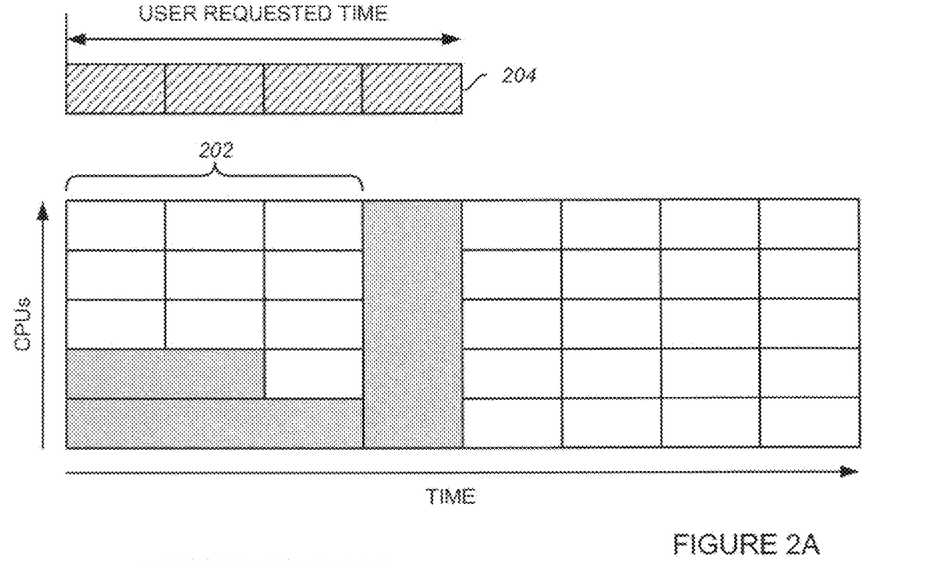
FIGS. 2A and 2B are graphical representations of backfill job scheduling, according to an embodiment.
Figure 2B:
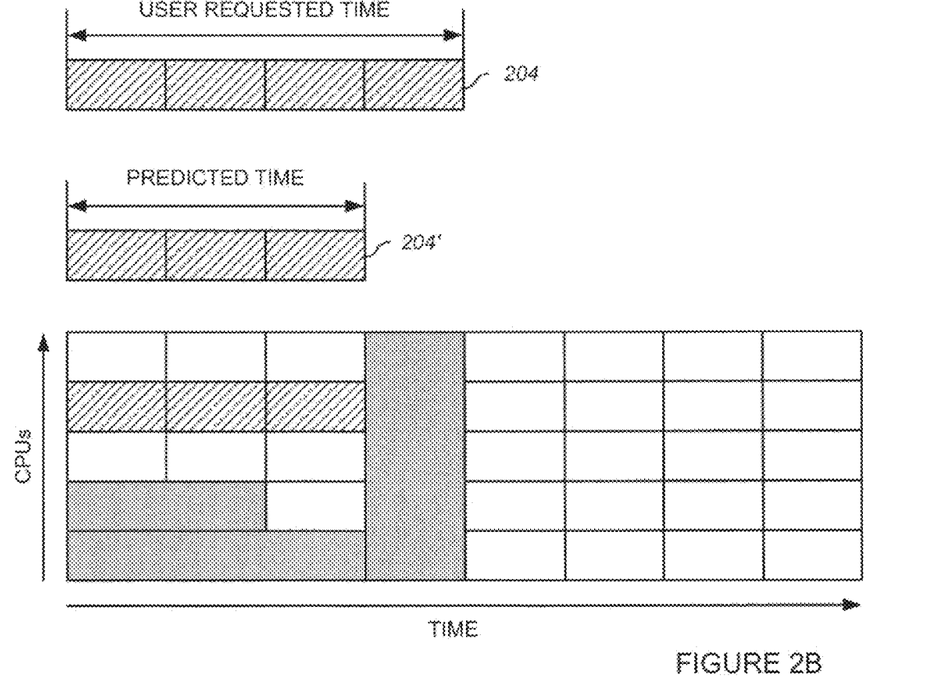

Methods of job scheduling will now be described. As shown in FIGS. 2A and 2B, job scheduling can be visually represented using a two-dimensional chart, in this particular example with time along the horizontal axis and the number of processors along the vertical axis. Each job can be thought of as a rectangle whose length represents the time, and whose width represents the number of processors, required to execute the job. In the context of the present disclosure, the length can represent either the user requested time or the allocated time, and this will be clear from the context in which it is described.

As noted earlier, conventional backfill scheduling works by identifying available resources ("holes" in the two-dimensional chart) and scheduling jobs that fit those holes, based on the required resources as requested by users. However, if users overestimate the required resources then jobs may spend a long time in the queue waiting for available resources to run. This results in inefficient resource usage. For example, in FIG. 2A jobs which have already been scheduled are shown as solid rectangles. Job 204 has been submitted by a user with a request to use one unit of processor resources for four units of time. However, the available resources in the backfill window 202 do not meet the request and so cannot be scheduled in the backfill window 202. As used herein, the term "backfill window" refers to the time in the future the backfill scheduler has computed that an idle job will run. The resources for the job are available for this amount of time to run any other idle job that can complete within the backfill window.

Figure 3A:
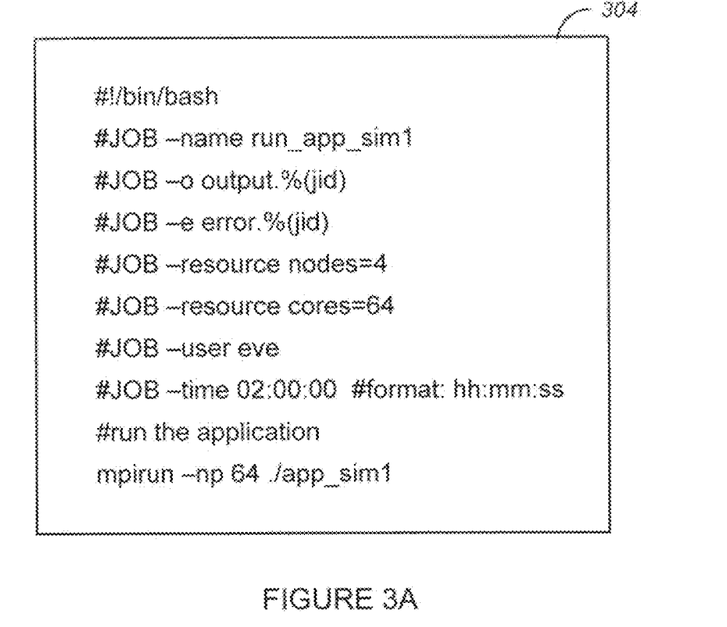
FIGS. 3A and 3B depict job submission scripts before and after modification by the data analyzer shown in FIG. 1, according to an embodiment.
Figure 3B:
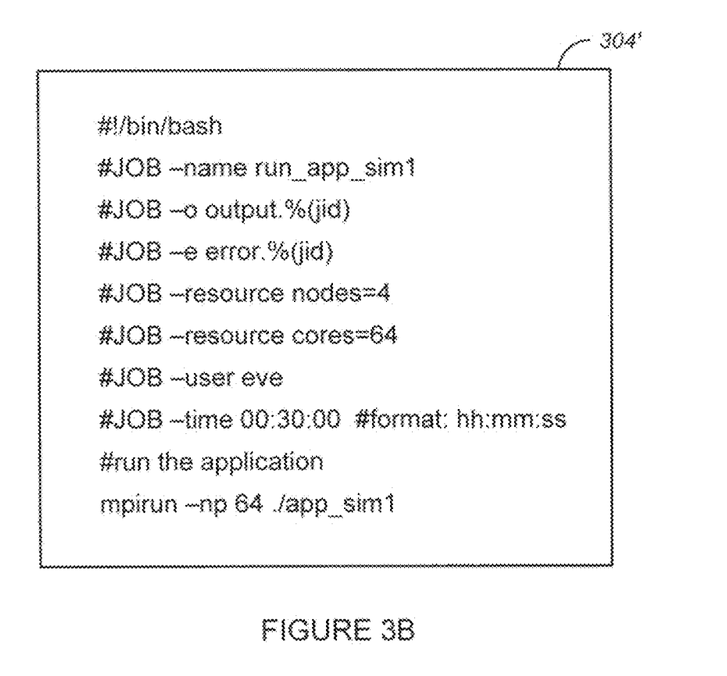

In embodiments, backfill scheduling of a job submitted by a user is based on information about previous job submissions made by that user. In particular, backfill scheduling is based on a believability score which represents how accurately the user estimated the resources required to run previous jobs. This can be further refined by adding details of the input files and application runtime settings, and/or performance information for the application/programs of the job. Thus, estimated run windows are allowed to "overlap"

based on the expectation that the job will finish early, i.e. will not use of all of the requested resources. To achieve this, the job submission script can be modified in order to 'fit' the job into a backfill window, as shown in FIG. 2B where the requested time for job 204 is optimized by the data analyzer 112 in order to fit into the backfill window. An example of modifying the job script is described below with reference to FIGS. 3A and 3B, where FIG. 3A shows a job submission script 304 as submitted by a user and FIG. 3B shows the modified job submission script 304'.

The job submission script 304 specifies, among other things, the application (#JOB—name run_app_sim1), the requested resource nodes (#JOB—resource nodes=4), the requested resource cores ((#JOB—resource cores=64), the user (#JOB—user eve), and the requested run time (#JOB—time 02:00:00). Thus, the job submission script specifies that Eve has requested the application "app_sim1" to be run with 64 cores for 2 hours (a total of 128 core hours). It is assumed that there is only a backfill window of 32 core hours available, i.e. 64 cores for ½ hour.

Accordingly, the data analyzer 112 determines whether the amount of resources requested by the user (in this example, Eve) accurately reflects the actual resources that will be required. This is done by analysing historical job submission information associated with that user (Eve) and statistics for each user stored in the data store 114. In embodiments, this accuracy is represented by a "believability score" for the user. The data store 114 is queried for user Eve's believability score. An exemplary table is shown below.

| Users | | |
|---|---|---|
| Name | NameID | Believability Score |
| Eve | 1 | 5 |
| Bob | 2 | 10 |
| Alice | 3 | 100 |

From the table it can be seen that Eve has a low believability score. Consequently, the data analyzer 112 changes (or issues an instruction to change) the requested resources specified in the submission so that the job 204' is now eligible to be scheduled in the backfill window as shown in FIG. 2B, i.e. the predicted run time is less than the user estimated run time.

The job submission script 304' after modification is shown in FIG. 3B. As is apparent, the command line for requested time has been changed from two hours to thirty minutes. The amount by which the requested resources are modified can be derived from the believability score and other variables such as the requested resources or application performance. In the simplest form, for example, the requested resources for a user with a believability score of 50% (that is, the user historically overestimates the required resources by a factor of two) can be halved. Consequently, an improvement in the overall resource utilization can be achieved since jobs which would otherwise not be backfilled can be.

An example of calculating believability scores will now be described.

At the end of each job, the requested resources and actual resources used are extracted and saved in the data store 114, for example in a table as shown below.

| Jobs | | | | |
|---|---|---|---|---|
| JobID | NameID | Application | Requested time (core hours) | Actual time used (core hours) |
| 100 | 1 | app_sim1 | 256 | 64 |
| 101 | 1 | app_sim4 | 48 | 16 |
| 102 | 3 | app_sim2 | 60 | 60 |
| 103 | 2 | app_sim1 | 64 | 64 |
| 104 | 3 | app_sim3 | 32 | 32 |

Figure 4:
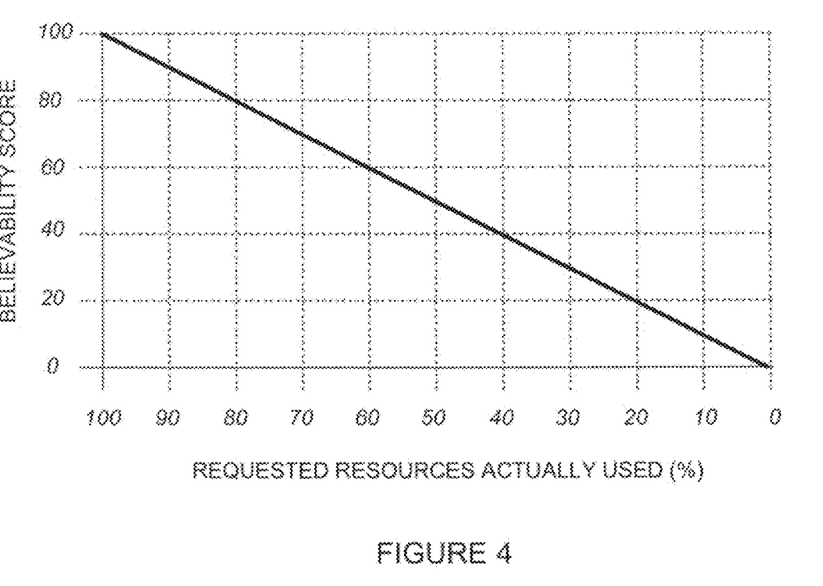
FIGS. 4 and 5 are plots showing how a believability score for a user can be determined based on the percentage of requested resources that were actually used to execute previous jobs of the user, according to embodiments.
Figure 5:
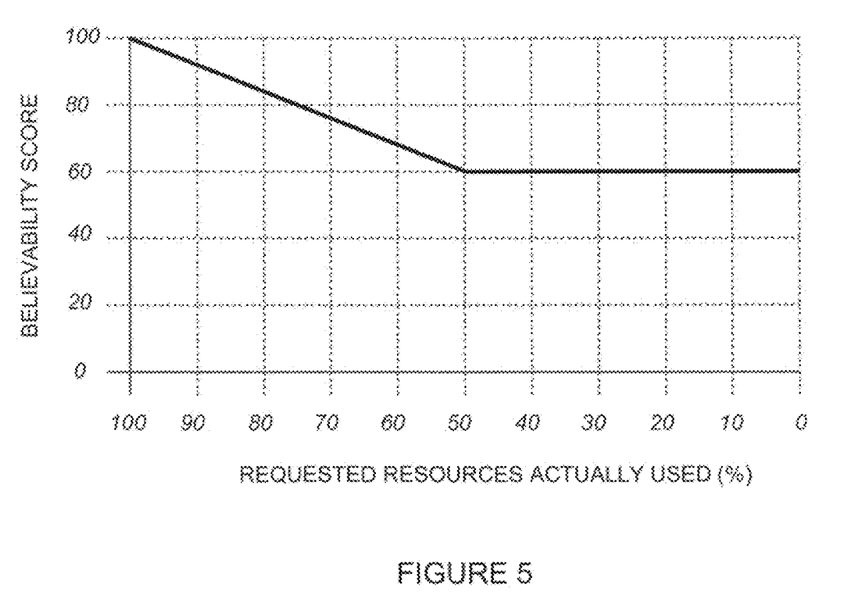

From these values the percentage of requested resources used for the job can be calculated. For example, Bob (NameID=2) requested 64 core hours with the actual time used also being 64 core hours. Thus, the percentage of requested resources used for the job is 100%. On the other hand, Eve (UserID=1) requested 256 core hours for one application ("app_sim1") and 48 core hours for another application ("app_sim4), but these actually only used 64 and 16 core hours (25% and 33%) to execute, respectively. Using these percentages and pre-defined functions the believability score can then be worked out. For example, as shown in FIG. 4, the function can be a linear mapping between the requested resources actually used and the believability score. Another function is shown in FIG. 5, which includes a linearly increasing relationship above a lower threshold. Such a function could be used for example for a developer user group submitting jobs that may end early during a testing phase of an application. By setting a lower threshold below which the believability score does not fall, the group would not be penalized too severely for overestimating the requested resources. For example, even if a job uses only 10% of the requested resources (corresponding to an overestimate of 90%) the believability score does not fall below 60. It will be appreciated that a range of functions can be defined to map percentage of resources used to believability score (The percentage can be an average, median or other value of the percentages). Furthermore, different functions can be assigned to different user groups depending on the way in which they use the system.

As noted earlier, there may be a situation where one job executes a number of applications as part of the different phases of the job. In such a situation, if performance information is available for some or all of the applications comprising the job then a believability score can be calculated for each application. The individual believability score could then be combined to give a more accurate resource request. Alternatively, the job can be split over the applications, that is, applications can be individually scheduled based on corresponding believability scores.

Figure 6:
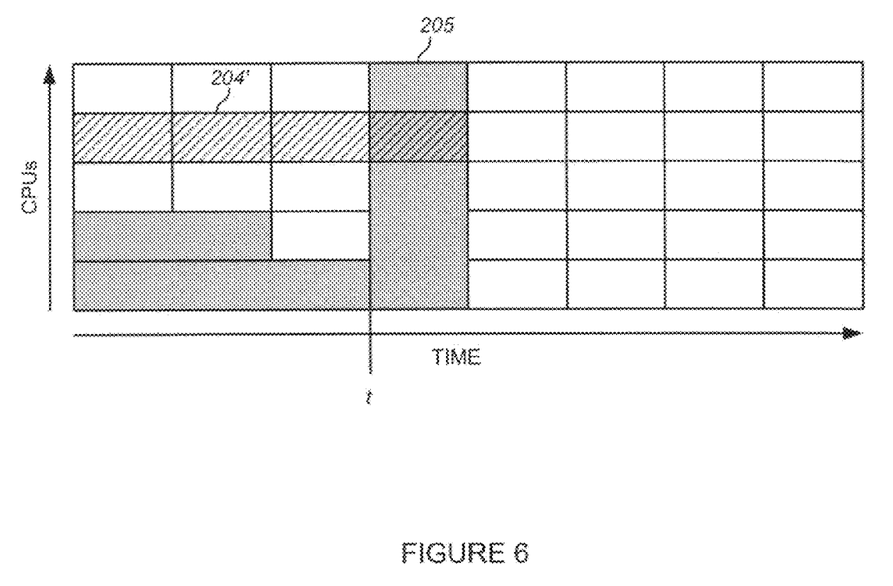
FIG. 6 is a graphical representation of an overrun decision during backfill job scheduling, according to an embodiment

To ensure fairness, it is desirable for (modified) backfilled jobs to respect other jobs that have already been scheduled. When there is a potential overlap between a backfilled job and a job that has already been scheduled a critical point is introduced where an overrun decision needs to be made. For example, as shown in FIG. 6, job 204' has been modified to fit into a backfill window and the critical point is reached at time t. One of two job scheduling options can be made at this point. The first option is to let job 204' run and delay job 205 that was previously allocated. The second option is to respect the priority of job 205. In the latter case, a checkpoint of job 204' is made so that it can be suspended and restarted from its current state at a later interval. Alternatively, job 204' can be terminated and restarted from scratch at a later time.

Figure 7:
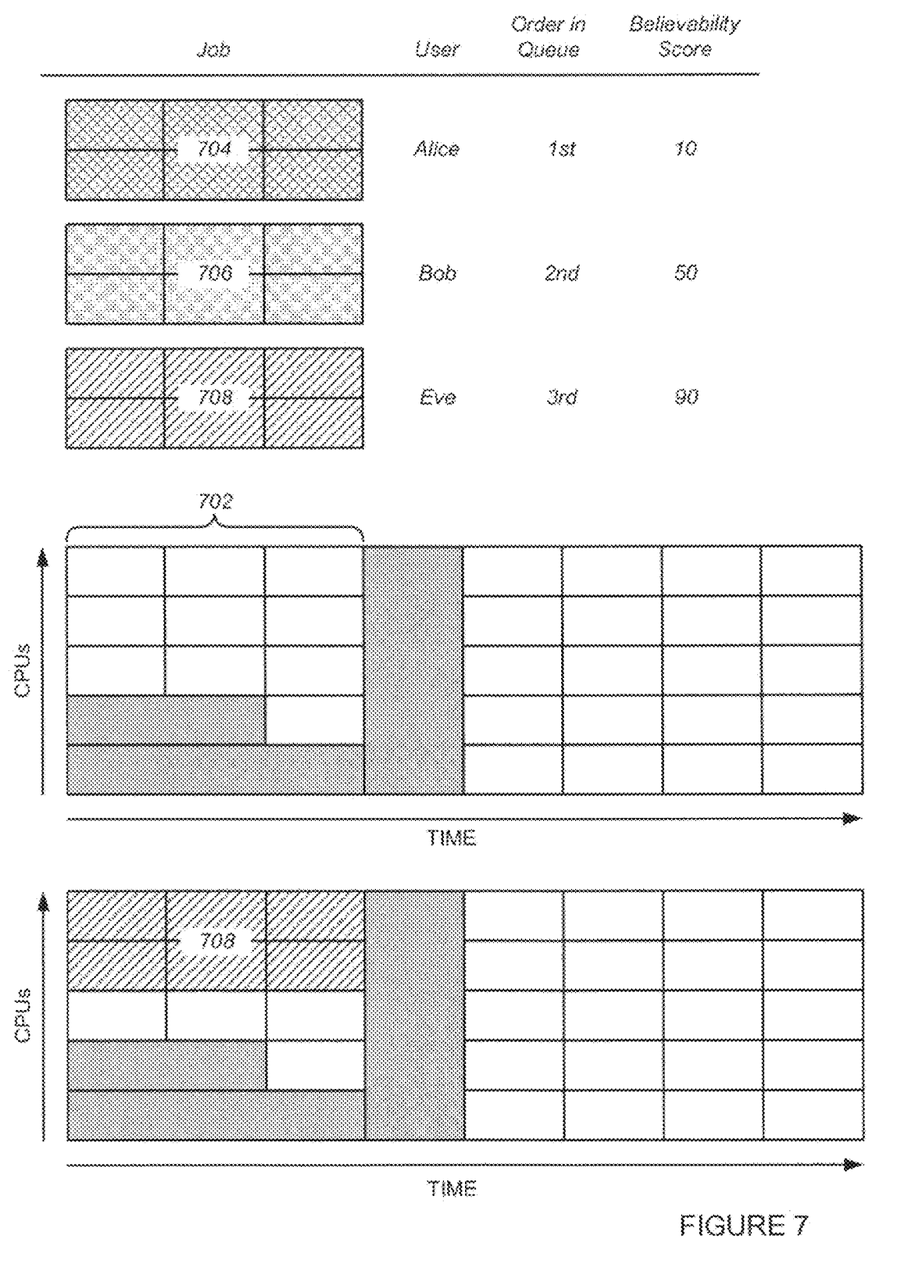
FIG. 7 is a graphical representation of prioritizing a job during backfill scheduling, according to an embodiment.

Another scenario is now described with reference to FIG. 7. Users Alice, Bob and Eve have each respectively submitted jobs 704, 706, 708 which would fit into a backfill window. Here, it is assumed that Alice and Bob historically give bad or average estimates of their resource usage, whereas Eve historically gives good estimates but her job is scheduled first. The jobs submitted by Alice, Bob and Eve are queued in the order in which they are submitted. In the simplest case, a job of a user with a higher believability score that is lower in the queue, for example job 708 of Eve, is allocated resources ahead of one or more jobs higher up in the queue, here jobs 704 and 706 of Alice and Bob.

In one embodiment, a multivariate analysis using the believability score and other variables such as time requested and performance information for the job which is to be run to generate a probability for each job to run in the backfill window. Here, multivariate analysis means that other variables such as the requested resources and application performance on top of the believability score to determine which job amongst all available will be run in the backfill window. It is noted that there is a difference between the believability score and the probability that a job can run in the backfill window. In effect, the probability is related to the amount of time that the requested resource is modified as described above. This probability can be derived from the believability score and other variables such as the requested resources or application performance. Using the probability can help to distinguish between user's with the same believability score.

If, when trying to fill a backfill window, a number of users have the same believability score then other ratings such as the time requested and application performance are used to determine which job will run. For example, say four users have submitted a job capable of fitting in a backfill window of 60 core hours. The details for the user and submitted jobs are given in the table below.

| Multivariate Analysis | | | | |
|---|---|---|---|---|
| User | Eve | Bob | Alice | Malory |
| JobID | 106 | 107 | 108 | 109 |
| Believability score | 50 | 50 | 50 | 40 |
| Resources requested (core hours) | 30 | 60 | 60 | 20 |
| Resources available (core hours) | 60 | 60 | 60 | 60 |
| Utilisation Factor (Assuming 60 core hour backfill window) | 0.5 | 1 | 1 | 0.33 |
| Application performance factor | 0.25 | 0.75 | 0.5 | 0.4 |

In one embodiment, selecting which of these jobs to run in a backfill window is in accordance with a process of elimination.

In a first step, the user with the worst (lowest) believability score is identified and eliminated. In this example, this eliminates Malory, whose believability score is 40.

In a second step, a utilisation factor is calculated for each of the remaining jobs (here, those of Eve, Bob and Alice), and the job with the highest utilisation factor value is selected. The utilisation factor can be defined as follows:

$$\text{Utilisation Factor} = \frac{\text{Resources requested}}{\text{Backfill window available}}$$

Assuming, for example, that there is an available backfill window of 60 core hours available, then Eve's job (Jo-bID=106) is eliminated from selection (utilisation factor=30/60=0.5). Bob's job (JobID=107) and Alice's job (JobID=108) both have a utilisation factor of 1 and still remain for selection.

In a third step, which in some cases may not be needed, application performance information is used to select which job should be run in the backfill window. Some 'application performance factor' is used to compare applications and the job with the highest value is selected to run. From this step the job from Alice is eliminated and Bob's job is run in the backfill window.

It is to be understood that the process need not be performed in this particular order and that not all steps need to be included.

Methods for populating the data store with information and using the captured data to optimise resource usage will now be described.

Figure 8:
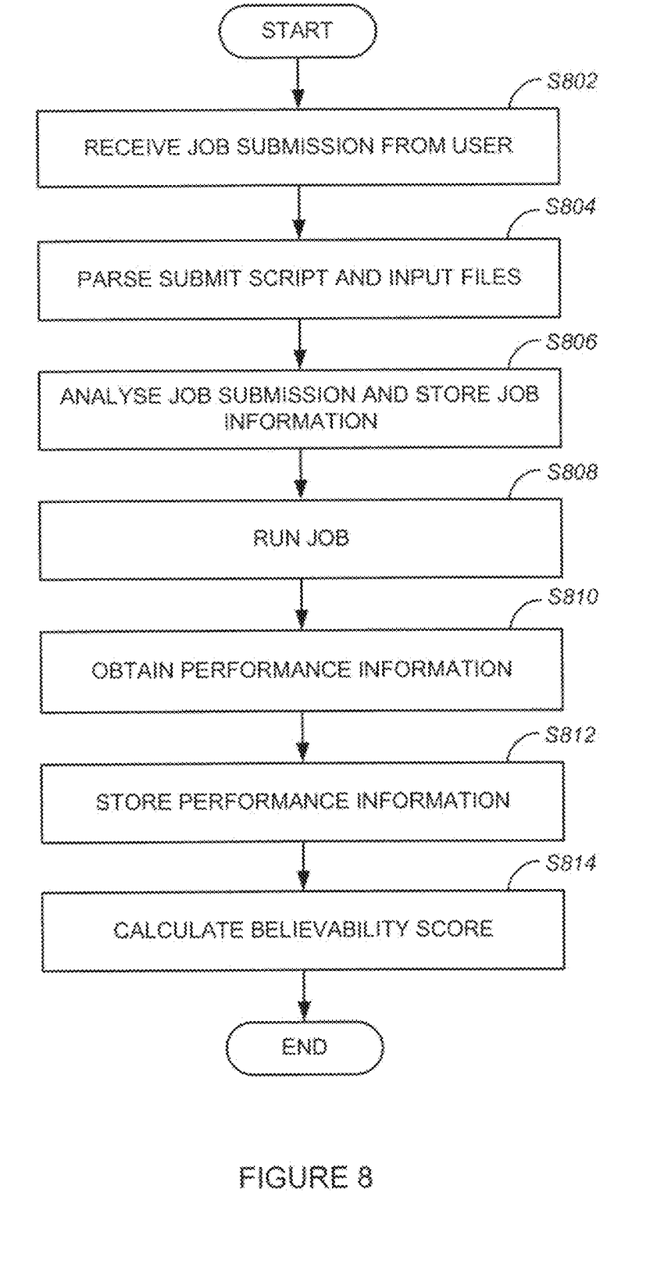
FIG. 8 is a flow diagram of a method of populating the data store shown in FIG. 1, according to an embodiment.

FIG. 8 is a flow diagram showing a method of populating the data store 114 shown in FIG. 1. The method comprises the following steps:

S802: A job to be executed by a computer system such as an HPC system is received from a user.

S804: The submit script and any input and data files are parsed by parser 110.

S806: The parsed script and files are analysed by the data analysis module 112 for pertinent information to identify the characteristics of the job, such as the number of processes, memory or other resources requested and copies or hash signatures of input and data files. This information is saved to data store 114.

S808: The job is then executed with the requested resources. Broadly speaking, a job can be executed using resources if it can be completed using those resources. Such resources can include, for example, an amount of processor time, number of processors, memory usage, input/output capacity, and so on.

S810: During execution of the job, regular snapshots of the performance of the job are taken to characterise the application in terms of the resources it consumes including, for example, compute, memory, I/O and energy resources.

S812: The performance information is stored in the data store 114. From the obtained information, the data analysis module 106 can build a characterising picture of the job and its performance in terms the resources requested and how efficiently they were used.

S814: The believability score for the user is calculated based on the data collected at steps S806 and S810.

Figure 9:
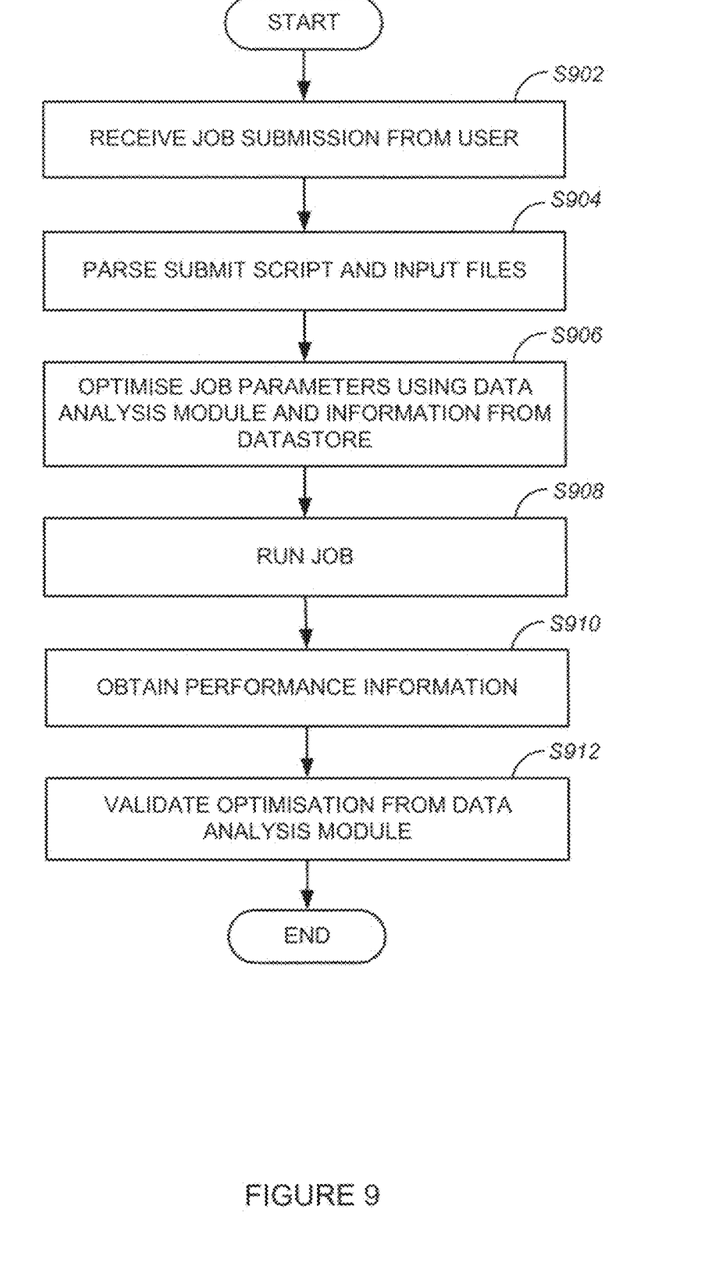
FIG. 9 is a flow diagram of a method of job scheduling, according to an embodiment.

FIG. 9 is a flow diagram showing a method of scheduling a job by the data analyzer 112 shown in FIG. 1. The method comprises the following steps:

S902: A job to be executed by a computer system such as an HPC system is received from a user.

S904: The submit script and any input and data files are parsed by parser 110.

S906: The parsed data is then used to analyse the data store in order to optimise the job parameters. This may involve modifying the job submission to use the optimised parameters, for example changing the requested time.

S908: The job is then run with the updated resources.

Additional steps of the method can include:

S910: During execution of the job, regular snapshots of the performance of the job are taken to characterise the application in terms of the resources it consumes including, for example, compute, memory, I/O and energy resources.

S912: On the basis of the performance information, the integrity of the decisions made by the data analysis module 112 can be analysed after job completion to see if the optimisation performed as expected. The data store 114 can be updated with the outcome of this analysis to provide a rating on the effectiveness of the decision.

Referring to step S912 in more detail, at the end of a scheduled job a comparison can be made between the estimated resources used to schedule the job and the actual resources used. Here, the validation information is not directly used in the decision making of subsequent jobs because the application performance information from the run will already be fed back to the database. Rather, the information is used to report the effectiveness of the data analysis module in using backfill windows by providing statistics such as how many more jobs were run by changing the requested resources or by how much were jobs delayed due to bad decisions.

Figure 10:
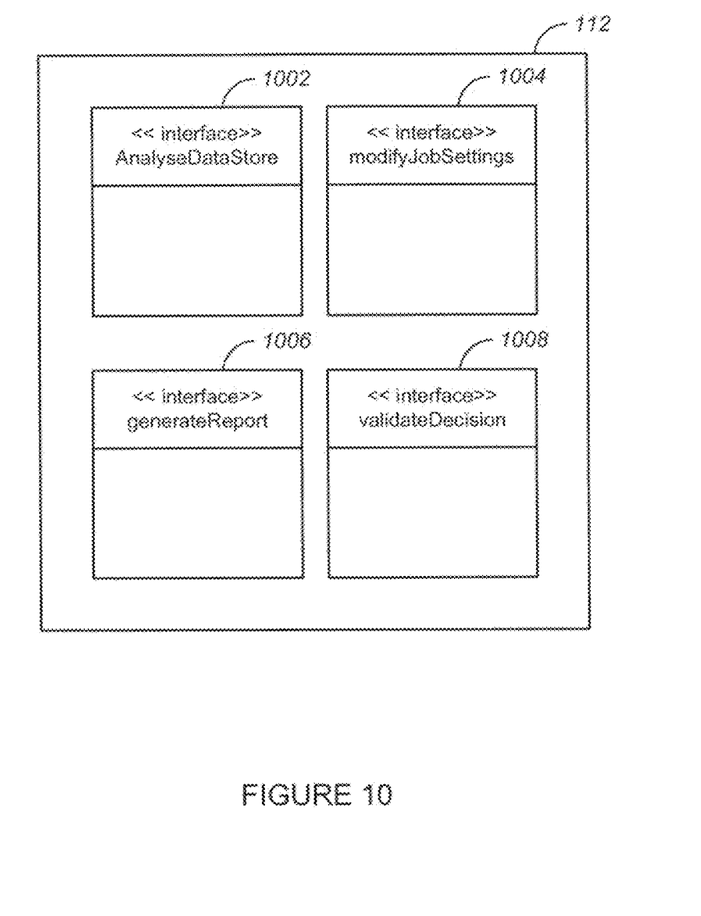
FIG. 10 is a block diagram of the data analyzer shown in FIG. 1, according to an embodiment.

FIG. 10 is a block diagram illustrating an implementation of the data analyzer 112 of FIG. 1 in accordance with an embodiment.

In one embodiment, the data analyzer 112 comprises a set of API interface routines for accessing and analysing the data store and for providing optimisation and reporting functionalities. More specifically, an "AnalyseDataStore" routine 1002 is configured to read information from the data store 114 and to analyse this information in order to calculate a believability score for example. The "modifyJobSettings" routine 1004 is configured to modify the job submission settings using the results determined by the "AnalyseDataStore" routine 1002 as described with reference to FIGS. 3A and 3B. The "generateReport" routine 1006 is configured to generate reports. A report can be a simple user notification or a more detailed report. The "validateDecision" routine 1008 is configured to implement the integrity validation functionality described above.

The data analyzer 112 may be implemented in hardware, software, firmware, or a combination thereof. For example, in one of a number of possible embodiments, the data analyzer 112 is implemented in software that is stored in a memory and that is executed by a processor (not shown). When implemented in hardware, the data analyzer 112 can be implemented in any one or combination of volatile memory elements (e.g., random access memory (RAM, such as DRAM, SRAM, SDRAM, etc.)) and nonvolatile memory elements (e.g., ROM, hard drive, tape, CDROM, etc.). Memory may incorporate electronic, magnetic, optical, and/or other types of storage media. Memory may also have a distributed architecture, where various components are situated remote from one another. If implemented in hardware, as in alternative embodiments, the logic may be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The design of the system shown in FIG. 1 lends itself to modification. In particular, the design allows different types of analysis to be carried out by means of different ('pluggable') data analysis modules. This has the advantage that, in addition to the data analyzer 112 (which may itself be a pluggable module) other pluggable modules can be created and implemented as needed. By encapsulating the relevant data within the data store and providing a standard interface to access the data, a wide range of such modules can be easily created. Examples of such modules include:

A module to obtain optimal performance of an application by mining through job scheduler and input file information and automatically choosing the best compute resources on which to run the application based on this;

A module to estimate the energy usage requirements of an application based on previous energy usage measurements for that application obtained from the data store and using this estimate of energy usage as a job scheduler metric to ensure that the data centre remains within its power threshold; and A module to direct budgeting decisions by reporting what parts of the HPC system are in highest demand or to analyse and identify where the key resource bottlenecks are for the most frequently used applications.

While embodiments have been described in the context of backfill scheduling in which a runtime limit is specified in a job submission, those skilled in the relevant art will appreciate that various embodiments are equally capable of being applied to other types of scheduling. For example, requested resources can be specified in terms of a processor limit, a memory limit, an input/output limit, and so on.

Although the blocks of flow charts are illustrated in a sequential order, these blocks may where appropriate also be performed in parallel, and/or in a different order than those described herein. Also, the various blocks may be combined into fewer blocks, divided into additional blocks, and/or eliminated based upon the desired implementation. Furthermore, for the methods other processes disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. In addition, for the method and other processes disclosed herein, each block may represent circuitry that is wired to perform the specific logical functions in the process.

While the invention has been described with reference to exemplary embodiments, it will be apparent to those skilled in the art that various modifications and variations can be made without departing from the scope or spirit of the invention. For instance, features illustrated or described as part of one embodiment can be used with another embodiment to yield a still further embodiment. Thus, it is intended that the present invention include such modifications and variations as come within the scope of the appended claims and their equivalents.

What is claimed is:

1. A method of job scheduling in a computing environment, comprising:

collecting historical job data of job submissions received from a plurality of users, the historical job data comprising resource request data indicative of computing resources requested by each of the users for executing jobs, and resource usage data indicative of actual computing resources used by each of the users to execute the jobs;

calculating a score for each of the plurality of users by comparing the resource request data and the resource usage data, the score indicating a degree to which a user overestimates computing resources required to execute the jobs;

receiving a new job submission from a user of the plurality users, the new job submission specifying a new job to be executed and computing resources requested by the user for executing the new job;
calculating a utilization factor for the new job being a ratio of the computing resources requested by the user for executing the new job to computing resources available during a backfill window;
scheduling the new job for execution using the score of the user and the utilization factor of the new job; and
executing the new job on a subset of the available computing resources during the backfill window, wherein the backfill window is a period of time in the future that the new job will execute and wherein the subset of the available computing resources comprises fewer computing resources than the computing resources requested by the user.

2. The method according to claim 1, further comprising determining, during execution of the new job, that allocated computing resources are insufficient to complete the job, and one of terminating and suspending the new job.

3. The method according to claim 1, further comprising determining, after execution of the new job, an accuracy of the scheduling from a comparison between the allocated computing resources and the actual computing resources used to execute the new job.

4. The method according to claim 1, wherein:
the new job corresponds to a previously executed job for which historical job data has been collected;
the historical job data of the new job submission received from the user further comprises performance data indicative of a performance characteristic associated with executing the new job; and
scheduling the new job for execution by using the score for the user, the utilization factor, and the performance data.

5. The method according to claim 1, wherein jobs comprise one or more applications and the score for each of the plurality of users is calculated with respect to each application.

6. The method according to claim 1, wherein the score for each of the plurality of users is calculated using a percentage of requested computing resources actually used for previously executed jobs.

7. The method according to claim 1, wherein:
the new job submission is one of a plurality of new job submissions received from two or more of the plurality of users;
new jobs are ordered in a queue for execution; and
scheduling the new jobs for execution comprises prioritizing at least one new job that is lower in the queue but submitted with a higher score over at least one new job that is higher in the queue but submitted with a lower score.

8. A data analyzer, comprising:
a processor; and
a memory storing instructions which, when executed by the processor, cause the data analyzer to:
access a database storing historical job data of job submissions received from a plurality of users, the database comprising resource request data indicative of computing resources requested by each of the users for executing jobs, and resource usage data indicative of actual computing resources used by each of the users to execute the jobs;
calculate a score for each of the plurality of users by comparing the resource request data and the resource usage data, the score indicating a degree to which a user overestimates computing resources required to execute the jobs;
receive a new job submission from a user of the plurality users, the new job submission specifying a new job to be executed and computing resources requested by the user for executing the new job;
calculate a utilization factor for the new job being a ratio of the computing resources requested by the user for executing the new job to computing resources available during a backfill window;
schedule the new job for execution using the score of the user and the utilization factor of the new job; and
execute the new job on a subset of the available computing resources during the backfill window, wherein the backfill window is a period of time in the future that the new job will execute and wherein the subset of the available computing resources comprises fewer computing resources than the requested computing resources.

9. A data analysis apparatus, comprising:
a database storing historical job data of job submissions received from a plurality of users, comprising resource request data indicative of computing resources requested by each of the users for executing jobs, and resource usage data indicative of actual computing resources used by each of the users to execute the jobs; and
a data analyzer, comprising;
a processor; and
a memory storing instructions which, when executed by the processor, cause the data analyzer to:
access the database;
calculate a score for each of the plurality of users by comparing the resource request data and the resource usage data, the score indicating a degree to which a user overestimates computing resources required to execute the job;
receive a new job submission from a user of the plurality users, the new job submission specifying a new job to be executed and computing resources requested by the user for executing the new job;
calculate a utilization factor for the new job being a ratio of the computing resources requested by the user for executing the new job to computing resources available during a backfill window; and
schedule the new job for execution using the score of the user and the utilization factor of the new job; and
execute the new job on a subset of the available computing resources during the backfill window, wherein the backfill window is a period of time in the future that the new job will execute and wherein the subset of the available computing resources comprises fewer computing resources than the requested computing resources.

10. A computer system, comprising:
a database storing historical job data of job submissions received from a plurality of users, comprising resource request data indicative of computing resources requested by each of the users for executing jobs, and resource usage data indicative of actual computing resources used by each of the users to execute the job;
a data analyzer, comprising:
a processor; and
a memory storing instructions which, when executed by the processor, cause the data analyzer to:

access the database;

calculate a score for each of the plurality of users by comparing the resource request data and the resource usage data, the score indicating a degree to which a user overestimates computing resources required to execute the job;

receive a new job submission from a user of the plurality users, the new job submission specifying a new job to be executed and computing resources requested by the user for executing the new job; and calculate a utilization factor for the new job being a ratio of the computing resources requested by the user for executing the new job to computing resources available during a backfill window;

a scheduler configured to schedule jobs including the new job using the score of the user and the utilization factor of the new job; and computing resources configured to execute scheduled jobs including executing the new job on a subset of the available computing resources during the backfill window, wherein the backfill window is a period of time in the future that the new job will execute and wherein the subset of the available computing resources comprises fewer computing resources than the computing resources requested by the user.

11. A non-transitory computer readable medium storing computer-readable code which, when executed by a computer, causes the computer to perform a method of job scheduling in a computing environment, the method comprising:

collecting historical job data of job submissions received from a plurality of users, the historical job data comprising resource request data indicative of computing resources requested by each of the users for executing jobs, and resource usage data indicative of actual computing resources used by each of the users to execute the jobs;

calculating a score for each of the plurality of users by comparing the resource request data and the resource usage data, the score indicating a degree to which a user overestimates computing resources required to execute job;

receiving a new job submission from a user, the new job submission specifying a new job to be executed and computing resources requested by the user for executing the new job;

calculating a utilization factor for the new job being a ratio of the computing resources requested by the user for executing the new job to the computing resources available during a backfill window;

scheduling the new job for execution using the score of the user and the utilization factor of the new job; and executing the new job on a subset of the available computing resources during the backfill window, wherein the backfill window is a period of time in the future that the new job will execute and wherein the subset of the available computing resources comprises fewer computing resources than the computing resources requested by the user.

* * * * *